(12) United States Patent
Karales

(10) Patent No.: US 6,508,247 B1
(45) Date of Patent: Jan. 21, 2003

(54) SOLAR SWIMMING POOL HEATER PANELS

(75) Inventor: William Karales, 52 Rose St., Smithtown, NY (US) 11787

(73) Assignees: William Karales, Smithtown, NY (US); Angelo Romano, Smithtown, NY (US)

( * ) Notice: Subject to any disclaimer, the term of this patent is extended or adjusted under 35 U.S.C. 154(b) by 18 days.

(21) Appl. No.: 10/075,238

(22) Filed: Feb. 15, 2002

(51) Int. Cl.[7] .................................................. F24J 2/42
(52) U.S. Cl. ........................ 126/564; 126/568; 126/627; 4/493; 4/502
(58) Field of Search ............................... 126/561–568, 126/627, 674, 675; 4/499, 498, 502, 493

(56) References Cited

U.S. PATENT DOCUMENTS

| | | |
|---|---|---|
| 2,870,455 A | 1/1959 | Reeves |
| 3,022,781 A | 2/1962 | Andrassy |
| 3,076,450 A | 2/1963 | Gough et al. |
| 3,683,428 A | 8/1972 | Morris |
| 4,079,726 A | 3/1978 | Voelker |
| 4,103,368 A | 8/1978 | Lockshaw |
| 4,174,945 A | 11/1979 | Gertz |
| 4,181,986 A | 1/1980 | Aine |
| 4,211,213 A | 7/1980 | Nissen et al. |
| 4,601,072 A | 7/1986 | Aine |
| 5,143,052 A | 9/1992 | Case |
| 5,216,762 A | 6/1993 | Denny |
| 5,347,984 A | 9/1994 | Klaren |
| 5,878,807 A * | 3/1999 | Takahashi .................... 126/626 |

FOREIGN PATENT DOCUMENTS

| | | | |
|---|---|---|---|
| DE | 4126796 A1 | 2/1993 | |
| FR | 2493893 * | 5/1982 | ................. 126/565 |
| FR | 2 600 697 | 12/1987 | |
| GB | 1059126 | 2/1967 | |
| GB | 2 144 035 A | 2/1985 | |

* cited by examiner

Primary Examiner—James C. Yeung

(57) ABSTRACT

Solar swimming pool heater panels which are rectangular or circular, black, plastic, floatable, corrugated, connectable, and rollable in bundles for placing on outdoor swimming pools for warming up and covering the water when not in use.

10 Claims, 3 Drawing Sheets

SOLAR SWIMMING POOL HEATER PANELS

BACKGROUND OF THE INVENTION

1. Field of the Invention

The present invention relates generally to swimming pool heaters. More specifically, the invention is a black plastic corrugated panel which floats in the water for increased heat transfer to the pool water from solar radiation.

2. Description of the related Art

The related art of interest describes various water heaters, but none discloses the present invention. There is a need for an economical solar radiation heat transfer agent to heat the water in swimming pools of various sizes and shapes. The relevant art will be discussed below.

U.S. Pat. No. 5,347,984 issued on Sep. 20, 1994, to Johannes A. Klaren describes flexible corrugated solar pool heater sheets having one side thereof matte black and the other side white that is suspended below the surface of the water in a swimming pool by tubular plastic floats and a series of clips. During daylight hours, the sheet is positioned with the blackened surface upwards and reversed at night to minimize heat loss. The sheets are 1 meter square and are stored by hanging on a wall. The solar pool heater panels are distinguishable for not having circulation ducts within the sheets.

U.S. Pat. No. 5,143,052 issued on Sep. 1, 1992, to Terry E. Case describes a floating solar pool heater consisting of a plurality of polyvinylchloride tubes arranged in many variations including parallel positioning, either close together or separated, or in a serpentine pattern to allow the pool water to flow through. The tubes can be transparent with darkened tape inside on the bottom portions. A separate bottom pipe can be included to form an air pocket for collecting heat. Flexible tubes at the inlet and outlet of the system by a pump. The aligned tubes can have baffles in one end inclined downward. The apparatus is distinguishable for teaching a separated tubing arrangement.

U.S. Pat. No. 3,076,450 issued on Feb. 5, 1963, to Edward W. Gough et al. describes a plastic swimming pool heater apparatus comprising a rectangular molded plastic frame having a transparent cover, a dead air space over a transparent plastic panel covering a serpentive coil lined with a black plastic layer for pool water entering from one end duct and exiting from an opposite end outlet duct, and a layer of polyurethane foam forming the open bottom. The apparatus is distinguishable for requiring a foam float and a serpentine water flow path.

U.S. Pat. No. 3,022,781 issued on Feb. 27, 1962, to Stella Andrassy describes a collapsible solar heat collector for a swimming pool made from two flexible plastic film members arranged either as a serpentine passageway or in the form of a pair of headers with a plurality of fluid conduits having inlet and outlet tubes. The rectangular frame is made from wooden rods. The plastic film may be polyethylene, vinylite, polytetrafluoroethylene or polychlorotrifluoroethylene. Either the top or bottom plastic layer is painted black or have carbon black incorporated in the plastic. The heater is distinguishable for requiring a frame and a serpentine flow with an outlet and an inlet tubing.

U.S. Pat. No. 2,870,455 issued on Jan. 27, 1959, to Charles E. G. Reeves describes a protective cover for an outdoor swimming pool to collect debris comprising an open mesh sheet of polyethylene or polypropylene.

U.S. Pat. No. 3,683,428 issued on Aug. 15, 1972, to Lester Morris describes a rigid, buoyant, insulating and rapid folding swimming pool cover comprising closed cell foam sheets joined by flexible hinges.

U.S. Pat. No. 3,859,980 issued on Jan. 14, 1975, to F. Robert Crawford describes a plastic solar heating unit comprising a plurality of abutting tubes arranged in parallel, covered by a transparent envelope and connected at their ends to manifolds. A pump and check valves are required to circulate water through the unit.

U.S. Pat. No. 4,079,726 issued on Mar. 21, 1978, to Percy Voelker describes a system for storage and use of solar energy in heating an above ground swimming pool comprising a floating solar cover of various configurations made from three heat fusable plastic sheets to form a serpentine channel. The top sheet is transparent, the intermediate sheet is black, and the bottom sheet can be any colored sheet.

U.S. Pat. No. 4,103,368 issued on Aug. 1, 1978, to James A. Lockshaw describes a pool cover having solar energy heating capability comprising a base sheet of vinyl or rubber-styrene polymer laminated with 15 to 100 mils of aluminum coating and having parallel spring steel fingers for rolling up the pool cover on a manifold connected to a reversible air blower.

U.S. Pat. No. 4,174,945 issued on Nov. 20, 1979, to David C. Gertz describes a corrugated floatable solar panel comprising a corrugated sheet of plastic sandwiched between and bonded to parallel plastic sheets which are hermetically sealed and light transmitting to heat the circulating water for a swimming pool. The sheets can be glass, thermoplastic plastic or resins resistant to ultraviolet light.

U.S. Pat. No. 4,181,986 issued on Jan. 8, 1980, and U.S. Pat. No. 4,601,072 issued on Jul. 22, 1986, to Harry E. Aine describes a method of covering and uncovering a swimming pool by using a thermally insulative buoyant cover having sinking means such as weights, inflatable bladder or a mechanical pull-down structure.

U.S. Pat. No. 4,211,213 issued on Jul. 8, 1980, to Roland N. Nissen et al. describes a solar panel hung on a fence having at least two corrugated heat retention surfaces with one surface having a plurality of dimples for heating water in a swimming pool.

U.S. Pat. No. 5,216,762 issued on Jun. 8, 1993, to Thomas P. Denny describes a floating pool cover apparatus comprising a rectangular housing having an opaque darkened bottom floor and a convex transparent top with ends defining a top wall, wherein spaced buoyant chambers are formed at opposed ends. Interlocking pegs between adjacent panels provide for a matrix of housings. A chemical releasing chamber may be provided.

U.K. Patent Application No. 1,059,126 published on Feb. 15, 1967, for Geoffrey J. Laister describes a combined solar heater and cover for a swimming pool comprising a series of inclined 10° to 15° rectangular wooden panels supporting a sheet of galvanized corrugated iron.

U.K. Patent Application No. 2 144 035 A published on Feb. 27, 1985, for Harry O. Boyd describes a swimming pool cover comprising an upper layer of black polyvinylchloride defining parallel water channels, and a bottom layer of closed cell polyurethane foam metallized on its bottom surface. A supply pipe at one corner is pumped into an apertured inlet manifold pipe. Straps at the same end of the cover are connected to a roller.

France Patent Application No. 2 600 697 published on Dec. 31, 1987, for Jean Fantini describes a method and device for the thermal insulation of swimming pools and the collection of solar heat comprising a floating frame having two transparent upper films and a lower black film with air pockets between them formed in a serpentine manner. The frame has an inlet and outlet for water. These films are locked by cylindrical strips to limbers-type U-shaped members which are fixed to the floating frame.

German Patent Application No. 41 26 796 A1 published on Feb. 18, 1993, for Juergen Weisse describes a roller swimming pool cover formed as a roller blind of translucent heat insulating and floating strips flexibly connected. The strips are hollow and translucent. The cover containing channel is parallel to the cover strips, and has a filter section at one side.

None of the above inventions and patents, taken either singularly or in combination, is seen to describe the instant invention as claimed Thus, a solar swimming pool heater solving the aforementioned problems is desired.

SUMMARY OF THE INVENTION

The present invention is an array of solar swimming pool heater panels which are rectangular, black, plastic, floatable, corrugated, connectable, and rollable in bundles for placing on outdoor swimming pools for warming up and covering the water when not in use. The panels can be circular or arcuate.

Accordingly, it is a principal object of the invention to provide solar swimming pool heater panels.

It is another object of the invention to provide solar swimming pool heater panels which are black plastic and floatable.

It is a further object of the invention to provide solar swimming pool heater panels which are connectable to cover a swimming pool.

Still another object of the invention is to provide solar swimming pool heater panels which are rollable for storage or portage.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
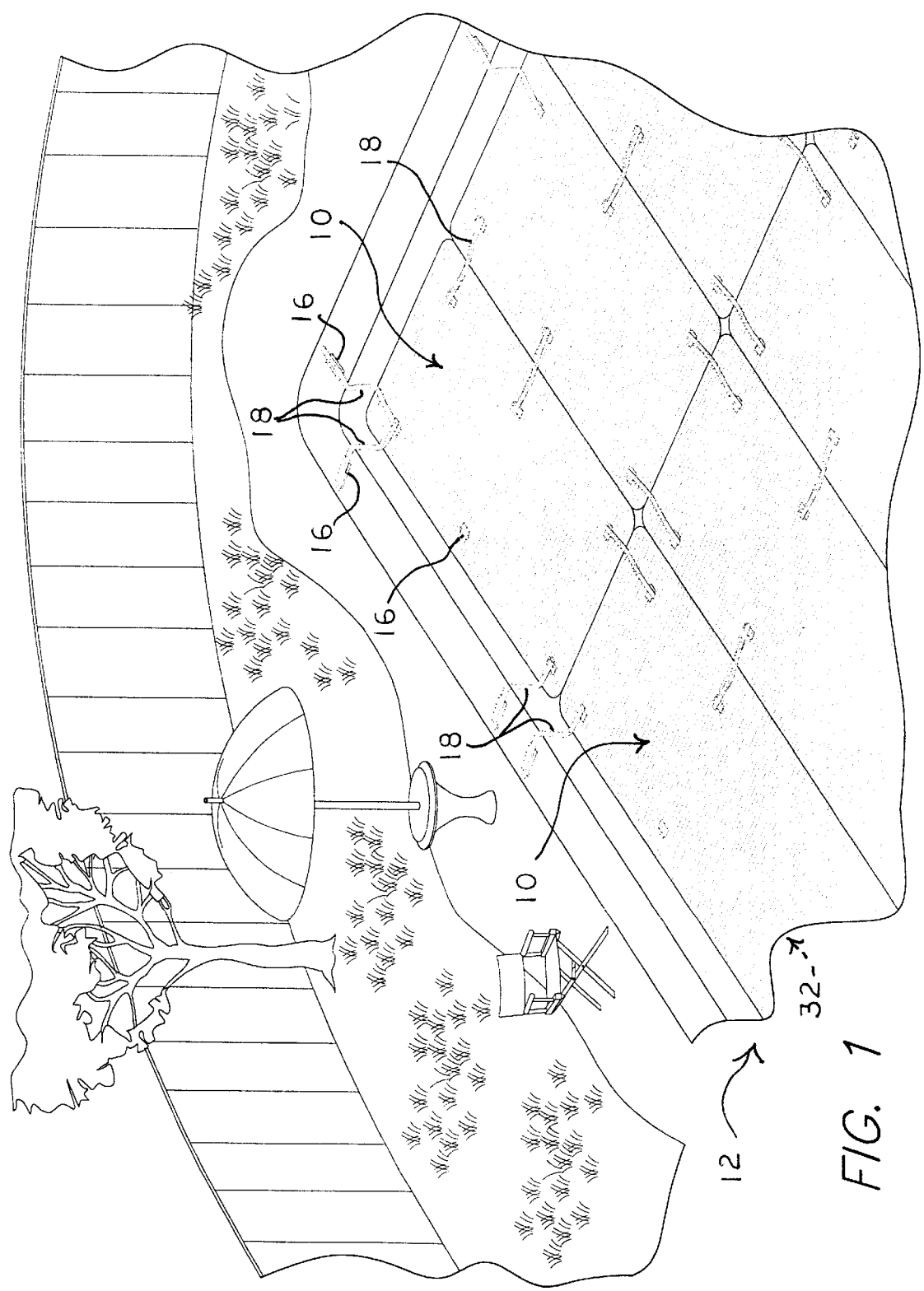
FIG. 1 is a partial environmental, perspective view of an outdoor in-ground swimming pool covered with a plurality of tethered floating rectangular heater panels according to the present invention.
Figure 2:
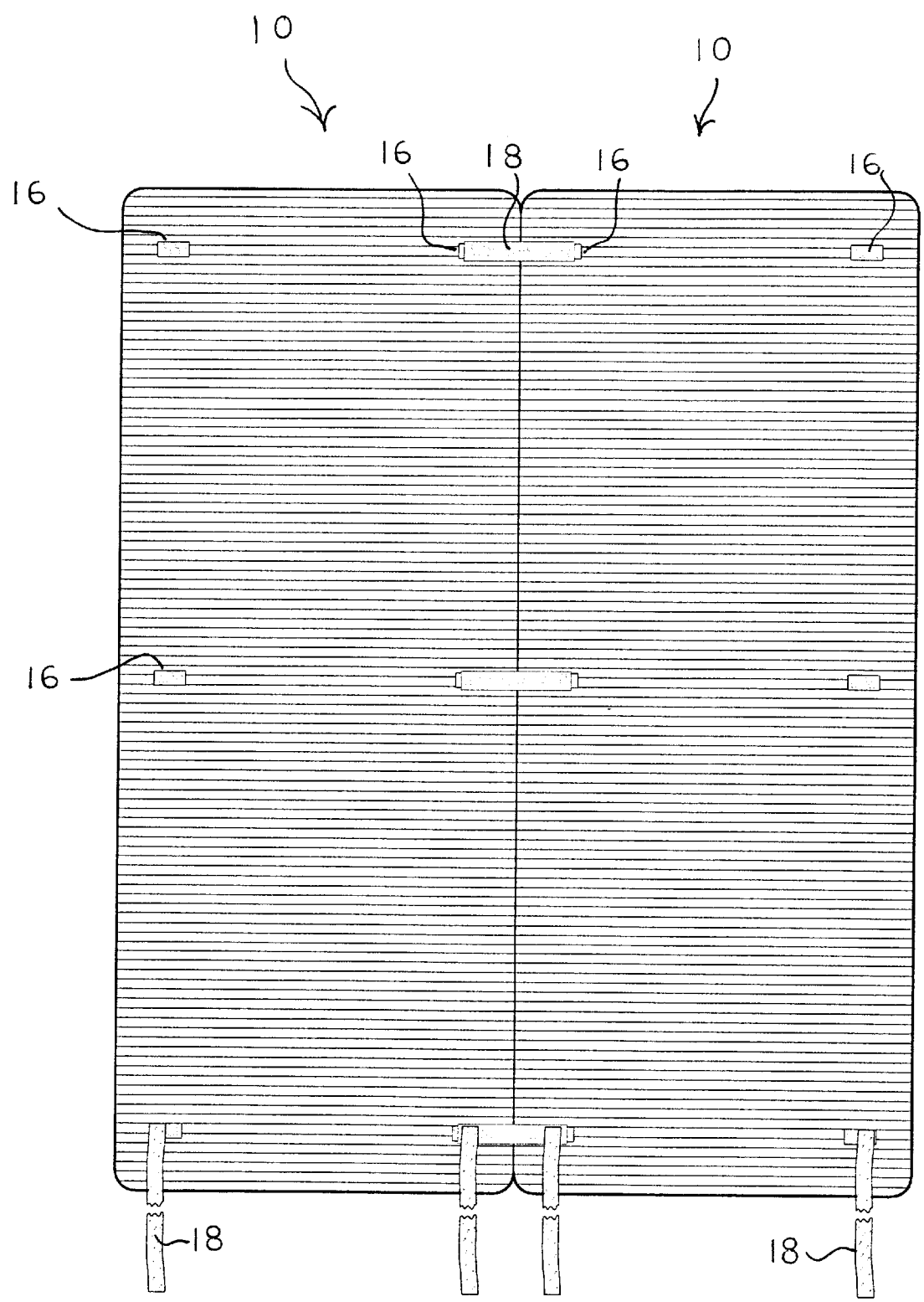
FIG. 2 is a top plan view of two heater panels with the associated tabs and tethers for combination thereof, and for attaching to the edges of the pool.

The present invention is directed to an inherently floating solar heating panel 10 and its method of use for heating and covering swimming pools such as an outdoor in-ground rectangular pool 12 illustrated in FIG. 1. Each panel 10 is shown rectangular in shape with rounded corners 14 and six loop fastening tabs 16, with one loop tab 16 proximate each corner 14 and two loop tabs 16 on the opposite length sides as depicted also in FIG. 2. Longer strips of hook fastening tabs 18 are utilized to attach the panels 10 together. The copings or sides 20 of the pool 12 will be equipped with spaced loop fastening tabs 16 for attaching the panels 10 via the longer hook tabs 18. It should be noted that the loop fastening tabs 16 located on the coping 20 of the pool 12 are deemed critical to provide a non-scratchy surface since the loop tabes 16 are permanently installed.

Although a rectangular outdoor in-ground pool 12 is depicted, it is contemplated that a circular outdoor aboveground or in-ground pool can be covered by circular or partially arcuate sheet panels (not shown) having the requisite hook and loop fastening patches.

Figure 3:
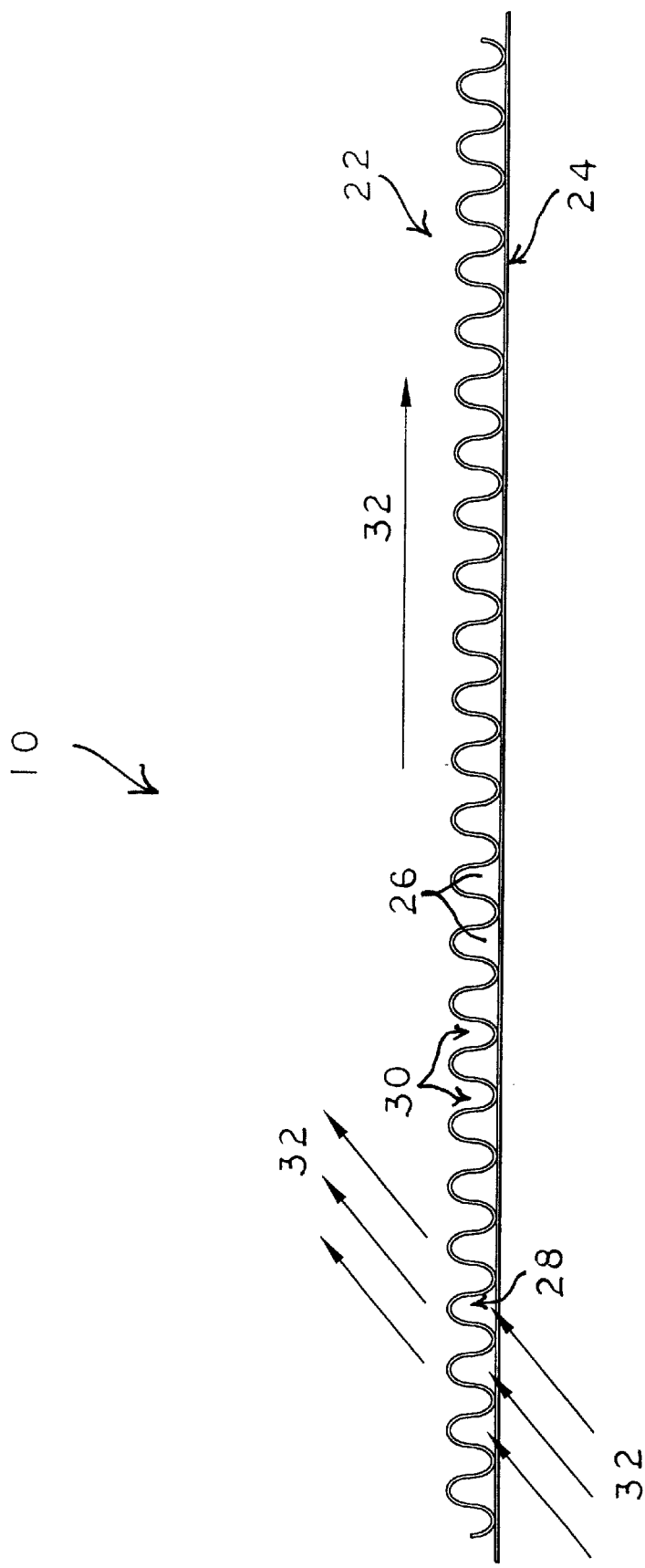
FIG. 3 is a side schematic view of one corrugated heater panel in water to show the circulation of water around and within the channels in the panel.

As shown in FIG. 3, a floating solar swimming pool heater panel 10 comprises a black plastic and corrugated sheet panel 10 having an upper surface with parallel corrugations 22, and a lower flat surface sheet 24 closing the parallel corrugations 22 to form closed solar radiation absorbing channels 26 with open ends 28 and open channels 30 (on top) containing the pool water 32.

The heater panels 10 inherently float on the surface of the pool water 32, and heat the pool water by conductively heating by solar radiation the water 32 traversing by convection in the corrugated channels 26, 30 and water proximate the top and bottom regions of the panels 10. In the evening at dusk, the panels 10 will continue to heat the pool water 32 for a limited period with the retained radiation heat.

The panels 10 are made from a plastic polymer selected from the group consisting of vinyl, polyvinylchloride, polyethylene, polypropylene, polytetrafluroethylene, polychlorotrifluoroethylene, and rubber-styrene containing carbon black to render the final product black for absorbing and retaining greater heat from solar radiation. Vinyl plastic is preferred for resisting the deteriorating effect of ultraviolet light the best.

The panel 10 is fabricated by heat or adhesive bonding of the corrugated upper portion 22 to the lower flat surface sheet 24. A single panel 10 can be conveniently rolled into a bundle for storage. Even the connected panel can be rollable into a bundle by a reel.

It is to be understood that the present invention is not limited to the embodiment described above, but encompasses any and all embodiments within the scope of the following claims.

I claim:

1. A floating solar swimming pool heater panel comprising:

a black plastic, floatable, and corrugated sheet panel;

said panel having an upper surface with parallel corrugations and open ends; and a lower flat surface closing bottom portions of the parallel corrugations to form solar radiation absorbing channels containing the pool water;

whereby said one or more heater panels inherently float on the pool water surface, and heat the pool water by conductively heating by solar radiation the water traversing the corrugated channels by convection.

2. The solar swimming pool heater panel according to claim 1, wherein the black colored, plastic, and corrugated sheet panel is made from a plastic polymer selected from the group consisting of vinyl, polyvinylchloride, polyethylene, rubber-styrene, polypropylene, polytetrafluroethylene, and polychlorotrifluoroethylene.

3. The solar swimming pool heater panel according to claim 1, wherein the corrugated plastic sheet panel upper portion is heat bonded to the lower flat surface.

4. The solar swimming pool heater panel according to claim 1, wherein the corrugated plastic sheet panel upper portion is adhesively bonded to the lower flat surface.

5. The solar swimming pool heater panel according to claim 1, wherein the corrugated sheet panel is made of sufficiently pliable material so as to be rollable into a bundle.

6. The solar swimming pool heater panel according to claim 1, wherein the corrugated sheet panel has six hook and loop fastening tabs with one tab at each corner and two tabs on opposite sides.

7. The solar swimming pool heater panel according to claim 1, wherein the panel is rectangular in shape and has rounded corners.

8. The solar swimming pool heater panel according to claim 1, wherein the panel is circular in shape.

9. The solar swimming pool heater panel according to claim 1, wherein the panel is rectangular in shape, and a plurality of panels are connected together by hook and loop fasteners for covering a pool.

10. The solar swimming pool heater panel according to claim 1, wherein the corrugated sheet panel is dimensioned in rectangular sizes of 4 feet by 10 feet and 4 feet by 20 feet.

* * * * *